United States Patent Office 3,520,140
Patented July 14, 1970

3,520,140
SOIL SEALING METHOD
Melvin F. Katzer, Danville, Calif., assignor to The Dow Chemical Company, Midland, Mich., a corporation of Delaware
No Drawing. Filed Oct. 12, 1967, Ser. No. 674,771
Int. Cl. E02b 3/00, 3/04
U.S. Cl. 61—1　　　　　　　　　　　　　　　3 Claims

ABSTRACT OF THE DISCLOSURE

Layers of water-swellable, but water-insoluble, polymers are sandwiched between soil masses. The polymers, which are in a finely divided solid state, imbibe water on contact and thus become activated in situ as water barriers. Under dry conditions, water vapor is free to pass through the barrier. The invention is especially useful for the improvement of agronomic practices in porous sandy soils and to prevent water seepage into subterranean formations such as coal mines.

---

The instant invention concerns technology for sealing soil, especially improving soil for agronomic practices and creating water barriers in soil masses.

The problem of controlling water migration into and through soil has been approached from many technical orientations. One line of technology involves dispersing chemicals into the water which carries them into contact with the soil surface where they are deposited to form a water-impermeable surface barrier. This approach is exemplified by the teachings of U.S. Pats. 3,124,934; 3,236,671 and 3,298,982.

Another approach has been to create cohered polymeric masses in situ within the soil. That is, the porous soil is impregnated with a copolymerizable monomer system containing monoethylenically and polyethylenically unsaturated monomers. Upon copolymerization, the soil is cohered to provide a highly water-impermeable barrier. The invention is effective for many purposes but generally requires considerable monomer to accomplish the desired objectives. This line of technology is illustrated by U.S. Pats. 2,801,984; 2,865,177 and 3,056,757.

It is an object of the present invention to provide a water barrier of reduced permeability to water within soil. Especially it is an object to reduce the amount of chemical reagents in the form of polymer necessary to achieve significant reductions in permeability. Other objects are to provide an improved technique for underlaying porous soil to improve its agronomic utility. General objects are to provide barriers of reduced permeability to water to prevent leakage into and from subterranean formations.

Accordingly, effective water barriers are formed in soil by sandwiching a relatively thin layer of discrete particles of a water-swellable polymer between soil masses. The layers should be essentially continuous in the sense that the solid polymer particles are distributed throughout the layer at a dosage of at least about 2 grams per square foot. Most effective barriers will be obtained, depending upon water-swellability of the polymer, by forming layers having from about 5 to about 15 grams of polymer solids per square foot. Optionally, the polymer may be utilized in admixture with soil solids. In such event, effective water barriers will be obtained utilizing relatively thin layers of such admixtures having at least about 0.3 percent by weight polymer solids. Useful polymer particle sizes should be within the range from about 50 to 200 mesh, U.S. Standard sieve series. Optimum particle sizing will be determined by the soil properties. With increasing soil particle size, larger polymer particles are used. Similarly larger polymer particles are employed with increasing amounts of soluble salts in the soil.

As used herein, the term "soil" encompasses the various porous surface layers of the earth, including soil compositions ranging in properties from those of clays to sand.

Water barriers created in the foregoing manner have several advantages in that a small amount of the particulate water-swellable polymer will effectively reduce the flow of liquid water through the interstices of the soil. At the same time, the swollen polymer stores water, which may be released to the adjacent soil under drier conditions. Moreover, under dry conditions the polymer contracts and readily allows the movement of moisture through the barrier. Simultaneously, of course, oxygen may move through the barrier. The latter is of considerable importance to agronomic practices wherein oxygen plays an essential role in keeping the soil sweet.

Incorporation of the layer of water-swellable polymer can be easily achieved simply by removing the layer of soil and spreading the polymer on the soil surface. Upon covering the soil, the polymer layer is held in place and will function in the aforeindicated manner. Alternately, the layer may be formed by spreading the polymer behind the bottom of a plow blade or into a translating cavity as illustrated in U.S. 3,276,208. Since the polymer can be applied in the form of a dry powder, it can be easily dusted or blown into a plow furrow, around sewers, pipes or tanks buried in the soil or into porous or cracked earthen formations. Other applications include the creation of horizontal and vertical water barriers to prevent earth slides, which occur due to water migration in soil, and in water impermeable blankets in earth-fill dams.

The following illustrates the effectiveness of small amounts of water-swellable polymers, when used in relatively thin layers within soil as water barriers. A 3 inch bed of porous sand was placed in the bottom of a column 4 inches in diameter and 4 feet high. The sand had a mean particle size of approximately $\frac{1}{16}$ inch. On top of this sand was placed another layer of 1000 grams of a finely divided sand-blasting sand. The water flow rate through the sand bed thus constituted, under a head of 3 feet of water, was found to be 8900 milliliters per minute.

The foregoing procedure was duplicated except that one cubic centimeter of a water-swellable polymer (about 0.8 gram) was blended into 250 grams of the finely divided sand blasting sand. This mixture formed a thin layer approximately ¾ inch thick. The polymer was a partially hydrolyzed copolymer of acrylamide with about 2000 parts per million by weight of N,N'-methylenebisacrylamide. It had a gel capacity of about 140 to 200. Gel capacity as used herein, refers to the water-swollen weight of the polymer (drained of free water) per gram of polymer. The water flow rate through the layer was 700 milliliters per minute.

When one cubic centimeter of the water-swellable polymer was mixed with 1000 grams of the sand blast sand, the polymer containing layer was increased to 2¾ inches and the flow rate was only reduced to 3500 milliliters per minute.

Good results are obtained by dusting the dry polymer solids on a soil surface and sandwiching the polymer under another layer of soil to keep the polymer in place. To illustrate this method, a pot was filled to a depth of approximately 3 inches with soil and a water-swellable polymer, as described above, was dusted on the soil surface to form an essentially uniform, continuous layer of polymer solids. Then a second soil layer approximately 3 inches deep was placed on top of the polymer dusted surface. Water flow rates through the soil were measured at a 1 inch head of water on top of the soil. A polymer dose of 5.4 grams per square foot of soil was discovered to completely prevent water seepage through a sandy soil. A dose of 8.2 grams per square foot prevented water seepage through a potting soil.

Polymers that may be employed in the instant invention include any of a large number of water-swellable polymers which may be obtained by known techniques. The useful polymers should have a gel capacity of at least 100. Particle size is optimum with the range from about 50 to about 200, U.S. Standard sieve series.

Preferred for use in the invention are water-swellable acrylic polymers. These are copolymers of water-soluble monomers having the general formula:

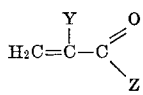

wherein Y is ethyl, methyl or hydrogen, Z is an amide group, an alkyl or dialkyl substituted amide group, wherein the alkyls may independently contain from 1 to 4 carbons, or an —OM group wherein M is an alkali metal or ammonium group. Examples of such monomers are acrylamide, methacrylamide, acrylic acid, sodium acrylate, potassium methacrylate and N-propyl acrylamide.

One or more of such monomers are copolymerized with a small amount of a cross-linking polyfunctional ethylenically unsaturated monomer. The amount of the cross-linker used may vary from 0.005 up to as much as 1 mole percent of the monomer charge to the polymerization system. Preferably, the amount of cross-linker is within the range from 0.05 to 0.7 mole percent, of the charged monomer.

Illustrative of such polyfunctional monomers are methylenebisacrylamide, N,N-diallylacrylamide, diallylamine, diallylmaleate, ethylene glycol dimethacrylate, divinylbenzene, divinyl ether or diethylene glycol, trivinylbenzene, and the like materials having more than one polymerizable double bond.

In addition to cross-linking by copolymerization with polyfunctional monomers, either ethylenically unsaturated, water-soluble monomers, or linear polymers of such monomers, can be lightly cross-linked to prepare water-swellable polymers by suitable irradiation of the monomer, or polymer, as the case may be, in aqueous solution.

Similarly, chain bridging in water-soluble polymers can be induced by a variety of chemical techniques, e.g., as by interchain linking through ester, amide and imide group forming reactions with appropriate reagents as will be recognized by the art skilled.

The preparation of other water-swellable polymers useful herein are described in U.S. Pats. 2,810,716; 3,021,269 and 3,032,538.

What is claimed is:

1. In a method for reducing the permeability of soil to water, the improvement which comprises incorporating within the soil an essentially continuous and relatively thin layer of a finely divided, particulate, water-swellable polymer in the amount of at least about 2 grams of polymer per square foot wherein the polymer layer is applied to a soil layer beneath the surface of the earth by dusting the polymer solids thereon.

2. A method as in claim 1 wherein the dusting of polymer solids is within a translating cavity beneath the surface of the earth.

3. In a method for reducing the permeability of soil to water, the improvement which comprises incorporating within the soil an essentially continuous and relatively thin layer of a finely divided, particulate, water-swellable polymer in the amount of at least about 2 grams of polymer per square foot wherein the polymer layer is incorporated within the soil by blowing the polymer into the soil as a dispersion in air.

References Cited
UNITED STATES PATENTS

| | | | |
|---|---|---|---|
| 3,181,612 | 5/1965 | West et al. | 166—283 |
| 3,302,717 | 2/1967 | West et al. | 166—295 X |
| 3,336,979 | 8/1967 | Ingraham et al. | 166—295 X |
| 3,373,814 | 3/1968 | Eilers et al. | 166—295 X |
| 668,362 | 2/1901 | Tomlinson | 61—13 |
| 2,801,984 | 8/1957 | Morgan et al. | 166—33 X |
| 2,842,338 | 8/1958 | Davis | 166—38 X |
| 2,865,177 | 12/1958 | Gnaedinger | 61—36 |
| 3,016,713 | 1/1962 | Deming | 61—1 |
| 3,021,298 | 2/1962 | Rakwitz | 61—1 |
| 3,276,206 | 10/1966 | Bolt | 61—1 |
| 3,353,601 | 11/1967 | Dollarhide et al. | 175—72 X |
| 3,397,172 | 8/1968 | Schuler et al. | 61—1 X |

STEPHEN J. NOVOSAD, Primary Examiner